United States Patent
Lin et al.

(10) Patent No.: US 12,091,345 B2
(45) Date of Patent: Sep. 17, 2024

(54) METHOD FOR RECOVERING PHOSPHORUS AND IRON AND USE THEREOF

(71) Applicant: TSINGHUA SHENZHEN INTERNATIONAL GRADUATE SCHOOL, Guangdong (CN)

(72) Inventors: Lin Lin, Guangdong (CN); Xuan Wang, Guangdong (CN); Xiao-yan Li, Guangdong (CN); Yijiao Chang, Guangdong (CN); Zhu Liang, Guangdong (CN); Bing Li, Guangdong (CN)

(73) Assignee: TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 18/405,089

(22) Filed: Jan. 5, 2024

(65) Prior Publication Data
US 2024/0228349 A1 Jul. 11, 2024

(30) Foreign Application Priority Data
Jan. 6, 2023 (CN) .......................... 202310017923.7

(51) Int. Cl.
| | | |
|---|---|---|
| C01B 25/45 | (2006.01) | |
| C02F 3/28 | (2023.01) | |
| C02F 9/00 | (2023.01) | |
| C02F 1/38 | (2023.01) | |
| C02F 1/44 | (2023.01) | |
| C02F 1/52 | (2023.01) | |
| C02F 1/66 | (2023.01) | |
| C02F 1/72 | (2023.01) | |

(52) U.S. Cl.
CPC ............... C02F 9/00 (2013.01); C01B 25/45 (2013.01); *C01P 2002/72* (2013.01); *C01P 2004/03* (2013.01); *C02F 1/385* (2013.01); *C02F 1/44* (2013.01); *C02F 1/5245* (2013.01); *C02F 1/66* (2013.01); *C02F 1/722* (2013.01); *C02F 3/28* (2013.01)

(58) Field of Classification Search
None
See application file for complete search history.

(56) References Cited

FOREIGN PATENT DOCUMENTS

| | | | | |
|---|---|---|---|---|
| CN | 105859030 A | * | 8/2016 | ................ C02F 9/14 |
| CN | 109956622 A | * | 7/2019 | ................ C02F 9/14 |
| CN | 116854277 A | * | 10/2023 | ................ C02F 1/28 |

* cited by examiner

*Primary Examiner* — Wayne A Langel
(74) *Attorney, Agent, or Firm* — Renner, Otto, Boisselle & Sklar, LLP (57) ABSTRACT

Present disclosure discloses a method for recovering phosphorus and iron, and use thereof. The method comprises the following steps of: S1: mixing iron salt and phosphorus-containing sewage according to the amount of the phosphorus-containing sewage to obtain a mixture, the concentration of the iron salt in the obtained mixture being 4 mg/L to 25 mg/L, fermenting the mixture at 20° C. to 60° C. for 2 days to 10 days, taking a fermentation supernatant, and removing the impurities; and S2: oxidizing the fermentation supernatant subjected to impurity removal in an acidic system. The present disclosure provides the method for recovering phosphorus and iron, which realizes high efficient recycling of phosphorus resources in sludge.

13 Claims, 4 Drawing Sheets

METHOD FOR RECOVERING PHOSPHORUS AND IRON AND USE THEREOF

CROSS-REFERENCE TO RELATED APPLICATION

The present application claims the benefit of and priority to Chinese Patent Application No. 202310017923.7, filed Jan. 6, 2023, the entire disclosure of which is incorporated herein by reference.

TECHNICAL FIELD

The present disclosure belongs to the technical field of wastewater recycling, and particularly relates to a method for recovering phosphorus and iron and use thereof.

BACKGROUND

Phosphate ore is a non-renewable nonmetallic mineral resource on earth, and it is estimated to experience depletion of phosphorus resources by the end of this century. In the face of the above situation, phosphorus recovery in phosphorus-rich municipal sludge is an effective mode of phosphorus recovery and utilization. The phosphorus content in dry sludge of municipal sludge can reach up to 27.6 kg/ton. Effective recovery and high efficient recycling of phosphorus resources in sludge can realize effective resource recycling of sludge.

The residual liquid of municipal sludge after anaerobic fermentation is called anaerobic fermentation broth. Municipal sludge composed of complex substances is anaerobic fermented, nutrient salts and volatile organic compounds are released from the solid phase into the anaerobic fermentation broth. Therefore, the anaerobic fermentation broth usually contains high concentrations of nitrogen, phosphorus and organic compounds, as well as rich metal elements such as iron, copper, zinc, manganese and calcium etc. At present, the main treatment method for anaerobic fermentation broth is to remove pollutants in the anaerobic fermentation broth to make it meet the sewage discharge standards. Meanwhile, due to the abundant nitrogen and phosphorus substances in the fermentation broth, it can also be recovered and recycled as fertilizer, achieving resource recovery on the basis of solving environmental pollution. The main recovery method is to use anaerobic fermentation broth to prepare ammonium magnesium phosphate (struvite) or vivianite as primary slow-release fertilizer for agricultural production, but above method also has many bottlenecks. For the recovery of struvite, on one hand, the preparation of struvite must theoretically meet a molar ratio of phosphate radicals, magnesium ions and ammonium radicals at 1:1:1. Due to the complex source and composition of sludge, the anaerobic fermentation broth obtained by simple anaerobic fermentation of sludge may have high ammonia nitrogen, low phosphorus and insufficient magnesium ions. Therefore, it is necessary to add a large amount of phosphate radicals and magnesium ions, and it is also necessary to add a large amount of alkaline solution at the same time to adjust pH value to prepare the struvite, resulting in high production cost. On the other hand, due to the presence of a large number of metal elements in the fermentation broth, the struvite is difficult to be directionally regulated in the preparation and recovery process, having a risk of heavy metal (Cu, Zn, etc.) pollution, resulting in low market acceptance for using as fertilizer and a risk of environmental pollution. For vivianite, due to the difficulty in achieving directional regulation in the recovery process, the recovery purity of vivianite is low. After being generated in anaerobic digestion of sludge, it mixes with sludge and is difficult to be separated naturally, and the recovered products are mainly amorphous and high in cost at the same time, which limits the efficient recycling of phosphorus recovered in sludge.

Therefore, it is urgent to develop a method for recovering phosphorus and iron to realize economic and high efficient recycling of phosphorus resources in sludge currently.

SUMMARY

The present disclosure aims to solve at least one of the technical problems in the prior art. Therefore, the present disclosure provides a method for recovering phosphorus and iron, which realizes high efficient recycling of phosphorus resources in sludge.

The first aspect, an embodiment according to the present disclosure relates to a method for recovering phosphorus and iron, comprising the following steps of:

S1: mixing 4 mg/L to 25 mg/L iron salt and phosphorus-containing sewage according to the amount of the phosphorus-containing sewage, then fermenting the mixture at 20° C. to 60° C. for 2 days to 10 days, taking the fermentation supernatant and removing impurities; and S2: oxidizing the fermentation supernatant subjected to impurity removal in an acidic system.

The method for recovering phosphorus and iron according to the embodiment of the present disclosure has at least the following beneficial effects:

in the present disclosure, iron salt is added as a coagulant. After mixing the iron salt with the phosphorus-containing sewage, a colloid is destabilized by physicochemical actions such as charge neutralization, bridging and netting capture and adsorption etc to obtain iron-based chemically enhanced primary sludge (Fe-CEPS), which belongs to first-class chemical sludge. Organic substances and phosphorus in the sewage are enriched into the sludge. The Fe-CEPS contains about 90% phosphorus in the sewage, so that contents of iron and phosphorus are high. In fermentation process, trivalent iron is reduced to divalent iron and released into fermentation broth, and non-apatite inorganic phosphorus combined with the sludge also releases orthophosphate from solid phase of the sludge into the fermentation supernatant at the same time. For this part of iron and phosphorus resources, oxidation is carried out under an acidic conditions to co-precipitate phosphorus and iron without adding additional iron ions and phosphate radicals, achieving the recovery of sludge phosphorus resources in a form of iron phosphate.

According to the present disclosure, iron phosphate crystals are prepared from the Fe-CEPS-based anaerobic fermentation broth by a co-precipitation method, and concentrations of iron and phosphorus in the fermentation process do not need to be strictly controlled in the preparation process, reducing the difficulty of preparation of iron phosphate and having a strong operability. Meanwhile, the co-precipitation method can basically realize recovery efficiency that a molar ratio of iron and phosphorus resources in the fermentation broth is 1:1, so that the preparation method is simple and easy to operate, and has a good recovery potential.

The above adding amount of the iron salt can ensure to avoid the problem that there is too little iron salt so that combination efficiency with phosphorus in the sewage is low, and the content of phosphorus in the Fe-CEPS is low, thus being difficult to prepare the iron phosphate. And to avoid the problem that there is too much iron salt so that combination with phosphorus is too tight, and the content of phosphorus released during fermentation is too low while the content of iron is too high, thus being not conducive to preparing the iron phosphate.

The above fermentation temperature and time can both ensure fermentation and dissolution efficiency of iron and phosphorus.

According to some embodiments of the present disclosure, the iron salt comprises at least one of ferrous sulfate ($FeSO_4$), ferric trichloride ($FeCl_3$), ferric trichloride hexahydrate ($FeCl_3 \cdot 6H_2O$) and polymeric ferric sulfate (PFS).

According to some embodiments of the present disclosure, further comprising adding a high-molecular coagulant aid in step S1.

According to some embodiments of the present disclosure, the high-molecular coagulant aid comprises at least one of activated silicic acid, polyacrylamide and sodium alginate.

According to some embodiments of the present disclosure, in step S2, the impurity removal comprises steps of carrying out centrifugation and membrane filtration on the fermentation supernatant.

According to some embodiments of the present disclosure, the centrifugation is carried out at a rotating speed of 2,000 rpm to 8,000 rpm.

According to some embodiments of the present disclosure, the centrifugation lasts for 3 minutes to 10 minutes.

According to some embodiments of the present disclosure, the filter membrane in the membrane filtration comprises at least one of cellulose and polyether sulfone hydrophilic filter membranes.

According to some embodiments of the present disclosure, the pore diameter of the filter membrane is 0.3 μm to 0.45 μm.

According to some embodiments of the present disclosure, in step S2, the pH value of the acidic system is 1 to 4.

In the present disclosure, by controlling the pH value of the acidic system to be 1 to 4, it avoids the co-precipitation of other metal elements with phosphorus and iron caused by exceeding the pH value, resulting in an increase of other impurities, and also avoids the deterioration of the precipitation effect of the iron phosphate when the pH value is lower than this value at the same time.

According to some embodiments of the present disclosure, an adjustment method of the acidic system is to add an acidic solution into the fermentation supernatant subjected to impurity removal.

According to some embodiments of the present disclosure, the acidic solution comprises at least one of sulfuric acid and hydrochloric acid.

According to some embodiments of the present disclosure, the molar concentration of the acidic solution is 1 mol/L to 6 mol/L.

According to some embodiments of the present disclosure, in step S2, the oxidizing agent in the oxidizing comprises hydrogen peroxide.

According to some embodiments of the present disclosure, the mass concentration of the hydrogen peroxide is 30% to 35%.

According to some embodiments of the present disclosure, the molar ratio of iron in the iron salt to the hydrogen peroxide is 1:0.5 to 2.

According to some embodiments of the present disclosure, the method for adding the oxidizing agent is to add the oxidizing agent in the system during stirring.

According to some embodiments of the present disclosure, in the process of adding the oxidizing agent, the stirring is carried out at a rotating speed of 150 rpm to 350 rpm.

According to some embodiments of the present disclosure, in the process of adding the oxidizing agent, the stirring lasts for 10 minutes to 30 minutes.

In the process of adding the oxidizing agent above, a white precipitate appears.

According to some embodiments of the present disclosure, in step S2, the stirring is continuously carried out after the white precipitate appears.

According to some embodiments of the present disclosure, in step S2, the continuous stirring lasts for 30 minutes to 300 minutes.

According to some embodiments of the present disclosure, in the fermentation supernatant, a molar ratio of iron to phosphorus is 1:0.3 to 3.15.

According to the present disclosure, the molar ratio of iron to phosphorus in the fermentation broth is ensured to be 1:0.3 to 3.15 by controlling reaction condition, and then iron and phosphorus resources in the fermentation broth are directionally and accurately recovered by controlling the pH value of the acidic system and the adding amount of the hydrogen peroxide, so that most other cationic impurities and organic substances can be simply and effectively controlled to remain in the solution, raw material sources of the iron phosphate are greatly expanded, and the obtained iron phosphate is spherical or near spherical nanoscale iron phosphate crystals with few impurities and high purity.

According to some embodiments of the present disclosure, the temperature of the acidic system is 20° C. to 90° C.

According to some embodiments of the present disclosure, the method for the fermenting comprises anaerobic fermentation and combined fermentation.

According to some embodiments of the present disclosure, the combined fermentation comprises adding an organic substance into a mixed solution of the iron salt and the sewage for combined fermentation.

Under the same conditions, compared with the anaerobic fermentation, the combined fermentation has a better iron and phosphorus release effect, because exogenous organic substances provide sufficient carbon sources, the release of iron and phosphorus can be promoted during anaerobic acidification.

According to some embodiments of the present disclosure, after the oxidizing, the method further comprises impurity removal.

According to some embodiments of the present disclosure, the method for the impurity removal comprises calcination.

In the present disclosure, there are a large number of organic substances in the above fermentation broth after fermentation, the release of iron and phosphorus is bound to be accompanied by the release and dissolution of organic substances at the same time, and some organic substances may also be co-precipitated during the precipitation of the iron phosphate, so that this part of organic substances may be removed by calcination.

According to some embodiments of the present disclosure, the calcination comprises a first heat treatment and a second heat treatment.

According to some embodiments of the present disclosure, the first heat treatment is carried out at a temperature of 350° C. to 450° C.

According to some embodiments of the present disclosure, the second heat treatment is carried out at a temperature of 650° C. to 900° C.

According to some embodiments of the present disclosure, the carrier gas atmosphere of the calcination is air or high-purity oxygen.

According to some embodiments of the present disclosure, after the continuous stirring, the method further comprises thermal insulation aging, solid-liquid separation, washing, drying and grinding before the impurity removal by calcination.

According to some embodiments of the present disclosure, the thermal insulation aging lasts for 10 hours to 24 hours.

According to some embodiments of the present disclosure, the method for the solid-liquid separation comprises at least one of centrifugal membrane filtration and high-speed centrifugation.

According to some embodiments of the present disclosure, the solvent in the washing comprises at least one of deionized water, high purity water, absolute ethanol and acetone.

According to some embodiments of the present disclosure, the washing is carried out for 3 times to 6 times.

According to some embodiments of the present disclosure, the drying comprises a first drying and a second drying.

According to some embodiments of the present disclosure, the first drying lasts for 5 hours to 24 hours.

According to some embodiments of the present disclosure, the first drying is carried out at a temperature of 30° C. to 50° C.

According to some embodiments of the present disclosure, the second drying lasts for 10 hours to 24 hours.

According to some embodiments of the present disclosure, the second drying is carried out at a temperature of 80° C. to 150° C.

According to some embodiments of the present disclosure, the grinding comprises at least one of manual grinding and ball milling.

According to some embodiments of the present disclosure, the ball milling is carried out at a rotating speed of 300 rpm to 500 rpm.

According to some embodiments of the present disclosure, the ball milling lasts for 10 hours to 24 hours.

According to some preferred embodiments of the present disclosure, the method for recovering phosphorus and iron comprises the following steps of:

A1: taking sewage subjected to grid treatment, adding an iron salt for coagulating sedimentation to prepare Fe-CEPS, and putting the Fe-CEPS into a fermentation bottle for constant-temperature anaerobic fermentation to realize dissolution of iron and phosphorus;

A2: subjecting the fermentation broth in the step A1 to high-speed centrifugation and rapid membrane filtration to remove solid impurities;

A3: putting the fermentation supernatant subjected to centrifugation and membrane filtration in the step A2 into a beaker container, placing the beaker container on a constant-temperature magnetic stirrer for constant-temperature and constant-speed stirring, and adding an acid solution to adjust a pH value to be 1 to 4 at the same time;

A4: adding hydrogen peroxide into the fermentation broth in the step A3 for oxidation, continuously stirring the mixture until a white precipitate appears, and continuously stirring the mixture; and A5: stopping stirring and continuously carrying out thermal insulation aging, and then carrying out solid-liquid separation, washing and drying, grinding and calcination to obtain a finished iron phosphate crystal product.

Use of the method above in prepares of lithium iron phosphate is provided according to an embodiment in second aspect of the present disclosure.

BRIEF DESCRIPTION OF THE DRAWINGS

The above and/or additional aspects and advantages of the present disclosure will become apparent and easy to understand from the descriptions of examples with reference to the following drawings, wherein.

DETAILED DESCRIPTION

Embodiments of the present disclosure are described in detail hereinafter, examples of the embodiments are shown in the drawings, wherein the same or similar labels throughout the drawings represent the same or similar elements or elements having the same or similar functions. The embodiments described hereinafter with reference to the drawings are exemplary, are only intended to explain the present disclosure, and cannot be understood as limiting the present disclosure.

Example 1

Figure 1:
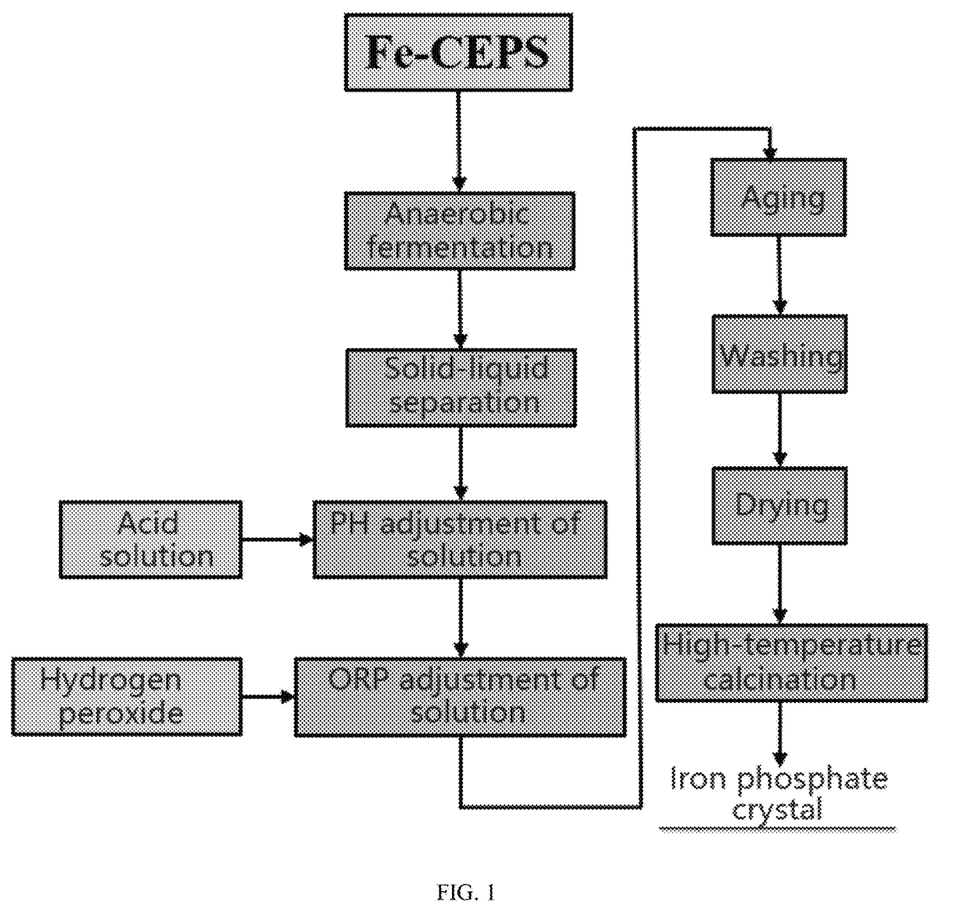
FIG. 1 is a flow chart of the method in example.

This example provided a method for preparing iron phosphate by separating and recovering iron and phosphorus resources from Fe-CEPS. As shown in FIG. 1, it comprised specific steps as follows.

A1, 450 mL of chemically enhanced primary sludge (8.33 g/L SS and 5.20 g/L VSS) at an iron content of 10 mg/L prepared by adding polymeric ferric sulfate (PFS) into raw water of a sewage plant was put into a serum bottle, exposed under nitrogen (99.99%) for 5 minutes, and subjected to anaerobic fermentation at 37° C. and 150 rpm for 6 days in a constant-temperature shaker.

A2, the fermentation supernatant obtained by the anaerobic fermentation in the step A1 was centrifuged in a high-speed centrifuge at 4,000 rpm for 5 minutes, and the supernatant was filtered with a 0.45 μm filter membrane to remove solid impurities.

A3, the supernatant after membrane filtration in the step A2 was placed on a constant-temperature magnetic stirrer, and stirred at a constant temperature of 40° C. and a constant speed of 250 rpm, and 1:1 $H_2SO_4$ solution was slowly dropwise added into the fermentation broth. The pH value of the solution was adjusted to 1.8.

A4, 30% hydrogen peroxide was slowly dropwise added into the fermentation broth obtained in the step A3 to oxidize ferrous ions in anaerobic fermentation supernatant to trivalent iron ions, wherein the addition amount was in a molar ratio of iron ions to the hydrogen peroxide at 1:1, a white precipitate appeared, and the stirring continued for 2 hours.

A5, after stirring for 2 hours in the step A4, the stirring was stopped and thermal insulation was continuously carried out for aging for 12 hours, the white precipitate and the supernatant were subjected to membrane filtration to realize solid-liquid separation, and the precipitate was washed with ultrapure water for three times and then dried, manually ground, and calcined at 700° C. under an air atmosphere for 12 hours to obtain an iron phosphate product.

FIG. 1 is a flow chart of the method in the example.

Figure 2:
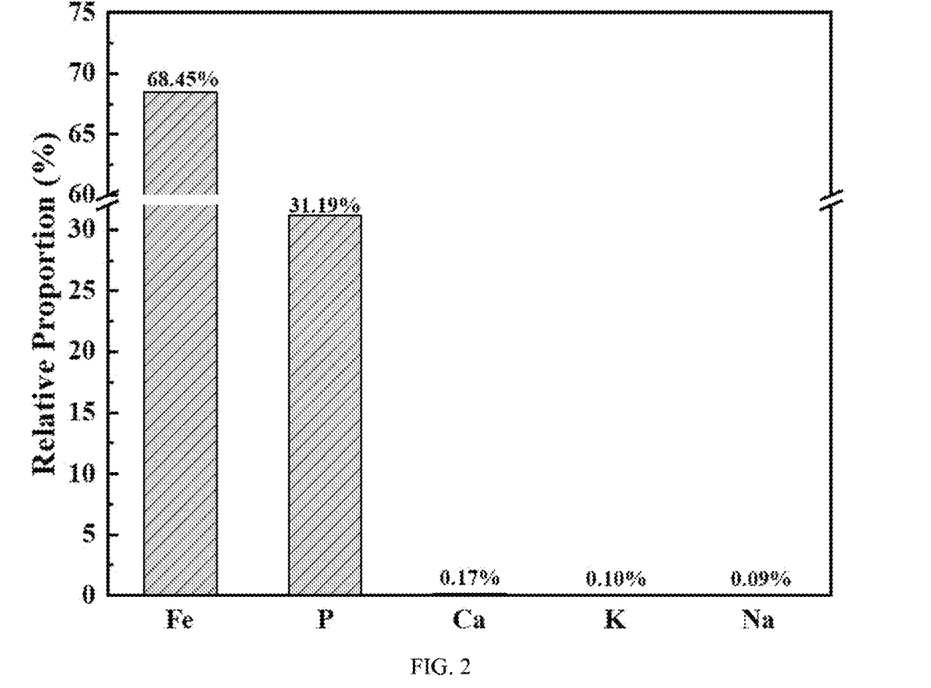
FIG. 2 is an ICP graph of all elements of iron phosphate prepared in Example 1.

FIG. 2 is an ICP graph of all elements of the iron phosphate prepared in Example 1. ICP results show that in the recovered iron phosphate through acidification fermentation and oxidation, iron and phosphorus are main material element compositions, with basically reaching a molar ratio of 1:1. Calcium (Ca), potassium (K) and sodium (Na) are main metal element impurities, the sum of relative mass fractions is about 0.36%. No other metal impurities are detected.

Figure 3:
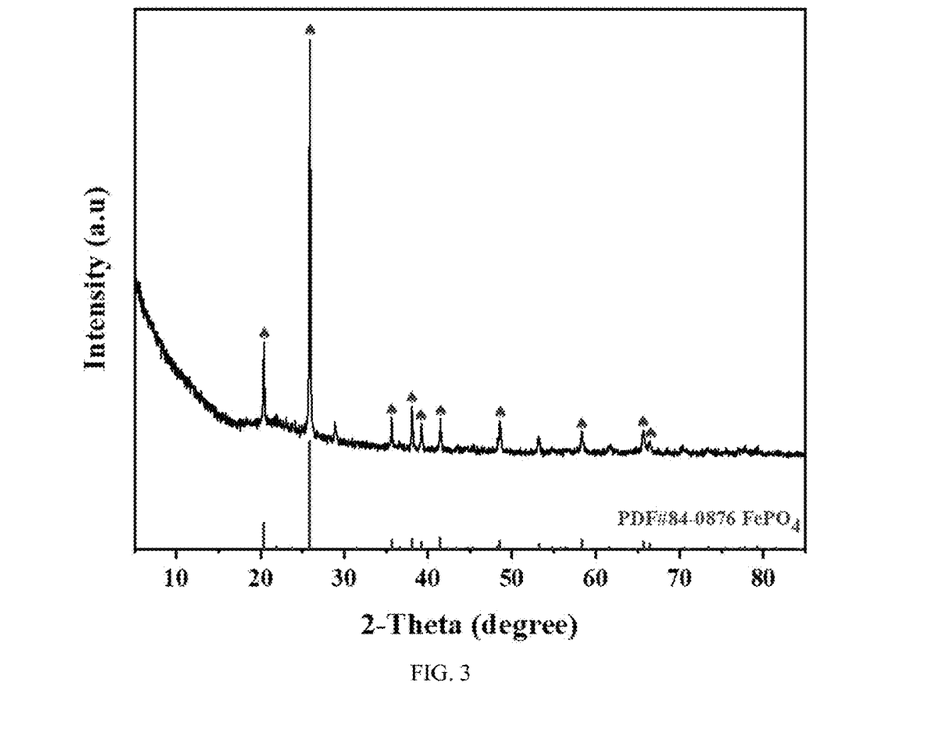
FIG. 3 is an XRD graph of the iron phosphate prepared in Example 1.
Figure 4:
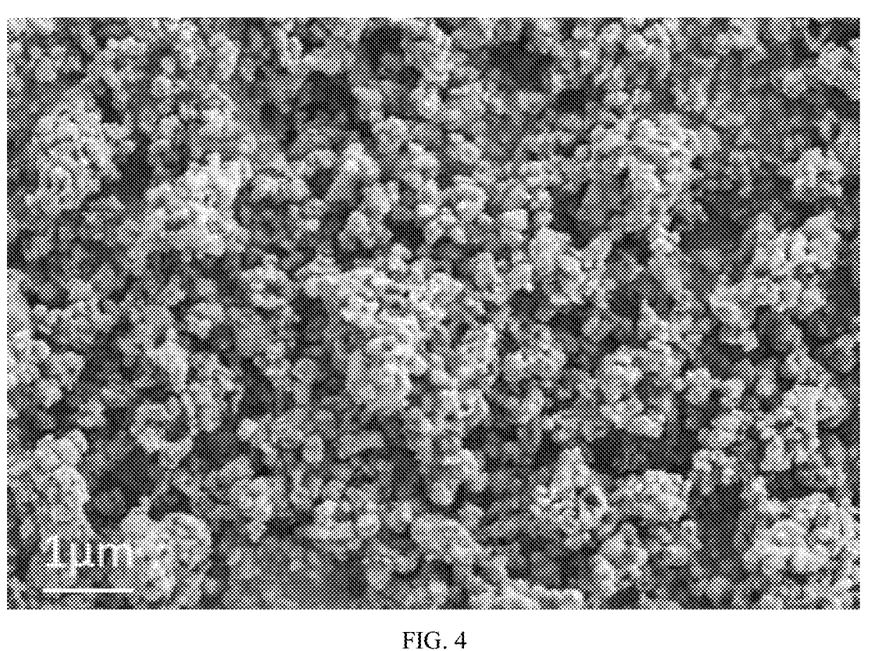
FIG. 4 is an SEM graph of the iron phosphate prepared in Example 1.
Figure 5:
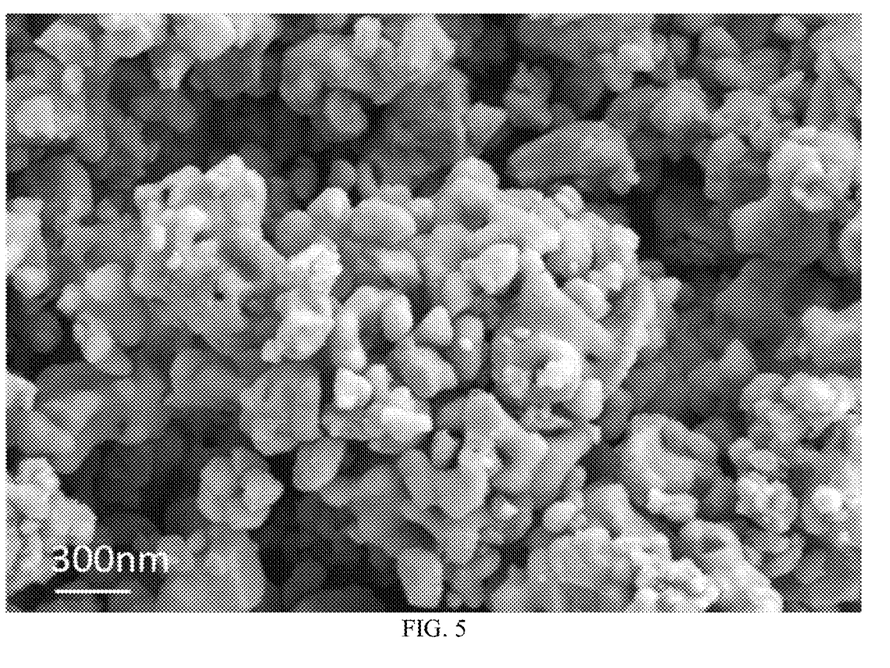
FIG. 5 is an SEM graph of the iron phosphate prepared in Example 1.
Figure 6:
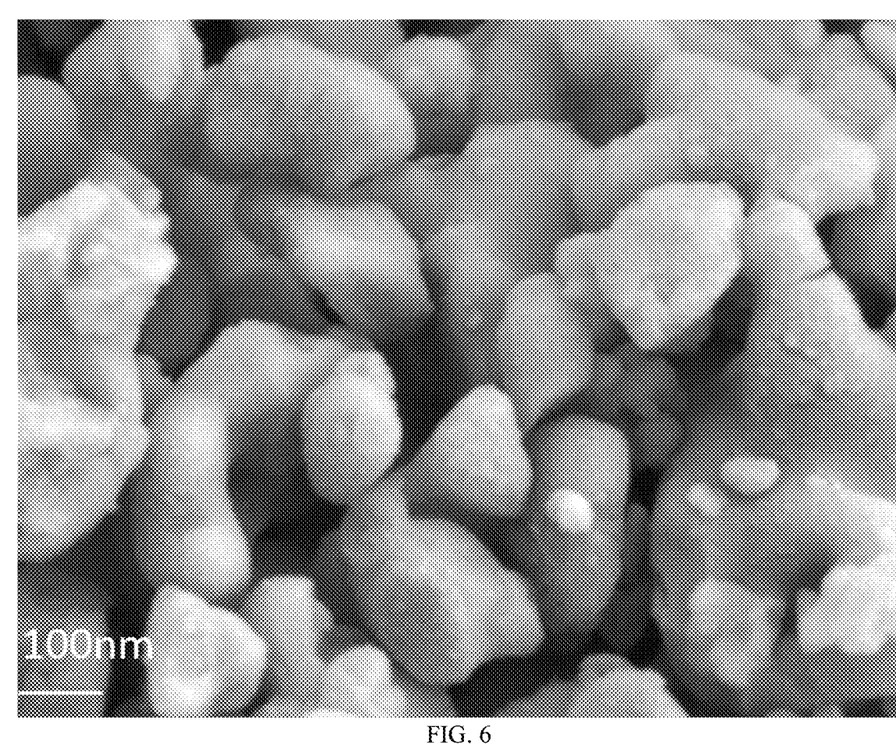
FIG. 6 is an SEM graph of the iron phosphate prepared in Example 1.
Figure 7:
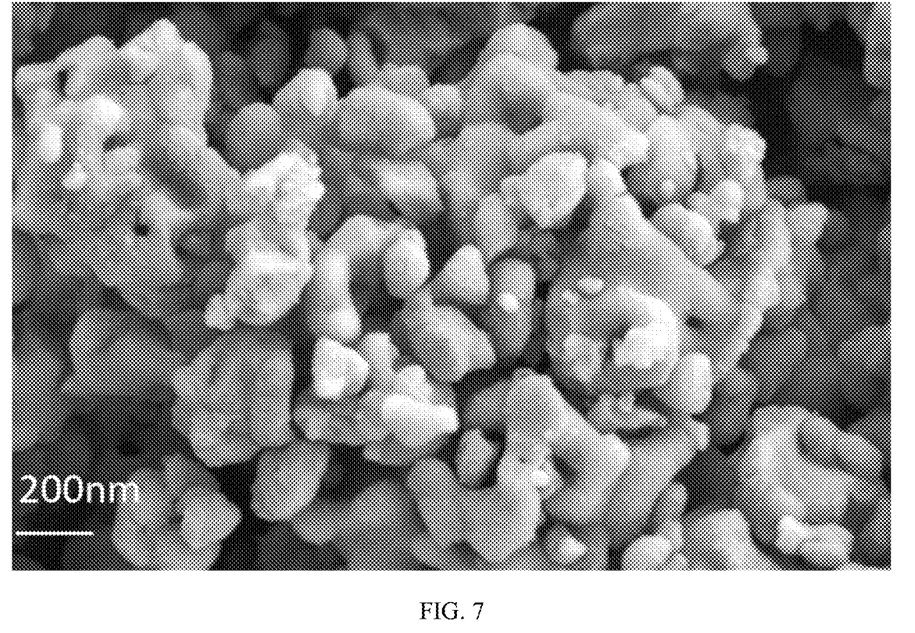
FIG. 7 is an SEM graph of the iron phosphate prepared in Example 1.

FIG. 3 is an XRD graph of the iron phosphate prepared in Example 1. Results show that an XRD peak of the prepared iron phosphate is sharp and prominent, and is highly coincident with the iron phosphate standard card (PDF #84-0876), and there is no obvious impurity peak.

FIG. 4 to FIG. 7 are SEM graphs of the iron phosphate prepared in Example 1. Results show that the prepared iron phosphate is nano-spherical iron phosphate with a regular structure, which has a diameter ranging from 100 nm to 300 nm.

Example 2

This example provided a method for preparing iron phosphate by separating and recovering iron and phosphorus resources from Fe-CEPS. As shown in FIG. 1, it comprised specific steps as follows.

A1, 450 mL of chemically enhanced primary sludge (9.62 g/L SS and 6.35 g/L VSS) at an iron content of 12 mg/L prepared by adding ferric trichloride ($FeCl_3$) into raw water of a sewage plant was put into a serum bottle, exposed under nitrogen (99.99%) for 3 minutes, and subjected to anaerobic fermentation at 37° C. and 150 rpm for 5 days in a constant-temperature shaker.

A2, the fermentation supernatant obtained by the anaerobic fermentation in the step A1 was centrifuged in a high-speed centrifuge at 4500 rpm for 5 minutes, and the supernatant was filtered with a 0.45 μm filter membrane to remove solid impurities.

A3, the supernatant after membrane filtration in the step A2 was placed on a constant-temperature magnetic stirrer, and stirred at a temperature of 50° C. and a constant speed of 250 rpm, and concentrated sulfuric acid was slowly dropwise added into the fermentation broth. The pH value of the solution was adjusted to 1.8.

A4, 30% hydrogen peroxide was slowly dropwise added into the fermentation broth obtained in the step A3 to oxidize ferrous ions in anaerobic was in a molar ratio of iron ions to the hydrogen peroxide at 1:2, a white precipitate appeared, and the stirring continued for 1.5 hours.

A5, after stirring for 1.5 hours in the step A4, the stirring was stopped and thermal insulation was continuously carried out for aging for 10 hours, the white precipitate and the supernatant were subjected to membrane filtration for solid-liquid separation, washed with ultrapure water once, washed with ethanol twice and then dried, manually ground, and calcined at 650° C. under an air atmosphere for 15 hours to obtain an iron phosphate product.

Example 3

This example provided a method for preparing iron phosphate by separating and recovering iron and phosphorus resources from Fe-CEPS. As shown in FIG. 1, it comprised specific steps as follows.

A1, 450 mL of chemically enhanced primary sludge (10.21 g/L SS and 5.46 g/L VSS) at an iron content of 15 mg/L prepared by adding ferrous sulfate ($FeSO_4$) and a small amount of polyacrylamide into raw water of a sewage plant was put into a conical flask, exposed under nitrogen (99.99%) for 10 minutes, and subjected to anaerobic fermentation at 37° C. and 200 rpm for 8 days in a constant-temperature shaker.

A2, the fermentation supernatant obtained by the anaerobic fermentation in the step A1 was centrifuged in a high-speed centrifuge at 5000 rpm for 4 minutes, and the supernatant was filtered with a 0.45 μm filter membrane to remove solid impurities.

A3, the supernatant after membrane filtration in the step A2 was placed on a constant-temperature magnetic stirrer, and stirred at a temperature of 30° C. and a constant speed of 280 rpm, and 6 mol/L $H_2SO_4$ solution was slowly dropwise added into the fermentation broth. The pH value of the solution was adjusted to 2.2.

A4, 30% hydrogen peroxide was slowly dropwise added into the fermentation broth obtained in the step A3 to oxidize ferrous ions in anaerobic was in a molar ratio of iron ions to the hydrogen peroxide at 1:0.5, a white precipitate appeared, and the stirring continued for 4 hours.

A5, after stirring for 4 hours in the step A4, the stirring was stopped and thermal insulation was continuously carried out for aging for 10 hours, the white precipitate and the supernatant were subjected to membrane filtration for solid-liquid separation, washed with ultrapure water once, washed with ethanol twice and then dried, manually ground, and calcined at 800° C. under an oxygen atmosphere for 16 hours to obtain an iron phosphate product.

Example 4

This example provided a method for preparing iron phosphate by separating and recovering iron and phosphorus resources from Fe-CEPS. As shown in FIG. 1, it comprised specific steps as follows.

A1, 450 mL of chemically enhanced primary sludge (4.48 g/L SS and 2.17 g/L VSS) at an iron content of 5 mg/L prepared by adding ferric trichloride hexahydrate ($FeCl_3 \cdot 6H_2O$) into raw water of a sewage plant was put into a serum bottle, exposed under nitrogen (99.99%) for 5 minutes, and subjected to anaerobic fermentation at 37° C. and 200 rpm for 5 days in a constant-temperature shaker.

A2, the fermentation supernatant obtained by the anaerobic fermentation in the step A1 was centrifuged in a high-speed centrifuge at 4,000 rpm for 6 minutes, and the supernatant was filtered with a 0.45 μm filter membrane to remove solid impurities.

A3, the supernatant after membrane filtration in the step A2 was placed on a constant-temperature magnetic stirrer, and stirred at a temperature of 80° C. and a constant speed of 300 rpm, and 1:1 HCL solution was slowly dropwise added into the fermentation broth. The pH value of the solution was adjusted to be 1.7.

A4, 30% hydrogen peroxide was slowly dropwise added into the fermentation broth obtained in the step A3 to oxidize ferrous ions in anaerobic was in a molar ratio of iron ions to the hydrogen peroxide of 1:1.5, a white precipitate appeared, and the stirring continued for 3 hours.

A5, after stirring for 3 hours in the step A4, the stirring was stopped and thermal insulation was continuously carried out for aging for 10 hours, the white precipitate and the supernatant were subjected to membrane filtration for solid-liquid separation, washed with deionized water for three times and then dried, manually ground, and calcined at 800° C. under an oxygen atmosphere for 10 hours to obtain an iron phosphate product.

Comparative Example 1

This comparative example provided a method for preparing iron phosphate by separating and recovering iron and phosphorus resources from Fe-CEPS. The difference between this comparative example and example 1 was that the ferric sulfate was mixed with phosphorus-containing sewage at 3 mg/L, and the rest conditions were the same.

In this comparative example, there was too little ferric sulfate and had a low binding efficiency with phosphorus in sewage. The content of phosphorus in the Fe-CEPS was low, making it difficult to prepare the iron phosphate.

Comparative Example 2

This comparative example provided a method for preparing iron phosphate by separating and recovering iron and phosphorus resources from Fe-CEPS. The difference between this comparative example and example 1 is that the ferric sulfate was mixed with phosphorus-containing sewage at 28 mg/L, and the rest conditions were the same.

The excessive amount of iron sulfate in this comparative example leaded to a tight binding state with phosphorous, and a content of phosphorus released during fermentation was too low while a content of iron was too high, thus being not conducive to preparing the iron phosphate.

Comparative Example 3

This comparative example provided a method for preparing iron phosphate by separating and recovering iron and phosphorus resources from Fe-CEPS. The difference between this comparative example and example 1 is that the fermentation was carried out at a temperature of 30° C., and the rest conditions were the same.

In this comparative example, the fermentation temperature was too low, resulting in a low release of iron and phosphorus in Fe-CEPS, making it difficult to effectively recover phosphorus and added iron from sewage.

Comparative Example 4

This comparative example provided a method for preparing iron phosphate by separating and recovering iron and phosphorus resources from Fe-CEPS. The difference between this comparative example and example 1 is that the fermentation was carried out at a temperature of 70° C., and the rest conditions were the same.

In this comparative example, the fermentation temperature was too high and led to the loss of activity of iron-reducing bacteria in sludge, making it difficult to maintain the acidification fermentation process, resulting in poor iron and phosphorus release efficiency and difficulty in recycling.

Comparative Example 5

This comparative example provided a method for preparing iron phosphate by separating and recovering iron and phosphorus resources from Fe-CEPS. The difference between this comparative example and example 1 is that the pH value in the step A3 was 0.5, and the rest conditions were the same.

In this comparative example, the pH value was too low, and iron and phosphorus dissolved and released into the solution could not effectively achieve co-precipitation, making it difficult to prepare iron phosphate.

Comparative Example 6

This comparative example provided a method for preparing iron phosphate by separating and recovering iron and phosphorus resources from Fe-CEPS. The difference between this comparative example and example 1 is that the pH value in the step A3 was 5, and the rest conditions were the same.

In this comparative example, the pH value was already neutral, the iron phosphate was precipitated at the moment, and impurities such as magnesium phosphate would be introduced in co-precipitation at the same time, resulting in an increase in the impurity content of the recovered iron phosphate.

The above descriptions for the specific exemplary embodiments of the present disclosure are for the purpose of explanation and illustration. These descriptions are not intended to limit the present disclosure to a precise form disclosed. Due to the vast territory and regional differences in China, the ingredients and properties of sewage and sludge from the sewage plant are different, and the components are relatively complex. Moreover, apparently, for those skilled in the art, various corresponding changes and modifications may be made according to the above technical solutions and concepts. The purpose of selecting and describing the exemplary embodiments is to reveal the specific principles and practical applications of the present disclosure, so as to make those skilled in the art realize and make use of various exemplary experimental solutions and various choices and changes of the present disclosure. All these changes and modifications are defined by the claims and equivalents thereof.

The invention claimed is:

1. A method for recovering phosphorus and iron, comprising the following steps of:
    S1: mixing iron salt and phosphorus-containing sewage according to an amount of the phosphorus-containing sewage to obtain a mixture, a concentration of the iron salt in the obtained mixture being 4 mg/L to 25 mg/L, fermenting the mixture at 20° C. to 60° C. for 2 days to 10 days, taking a fermentation supernatant and removing impurities; and
    S2: oxidizing the fermentation supernatant subjected to impurity removal in an acidic system to co-precipitate phosphorus and iron;
    wherein, in step S2, a pH value of the acidic system is 1 to 4.

2. The method according to claim 1, wherein the method further comprises impurity removal after the oxidizing.

3. The method according to claim 2, wherein the method for the impurity removal comprises calcination; wherein the calcination comprises a first heat treatment and a second heat treatment.

4. The method according to claim 3, wherein the first heat treatment is carried out at a temperature of 350° C. to 450° C.

5. The method according to claim 3, wherein the second heat treatment is carried out at a temperature of 650° C. to 900° C.

6. The method according to claim 1, wherein, in step S2, an oxidizing agent in the oxidizing comprises hydrogen peroxide.

7. The method according to claim 6, wherein a molar ratio of iron in iron salt to the hydrogen peroxide is 1:0.5 to 2.

8. The method according to claim 1, wherein a fermenting method comprises anaerobic fermentation and combined fermentation.

9. The method according to claim 8, wherein the combined fermentation comprises adding an organic substance into the mixed solution of the iron salt and the sewage for combined fermentation.

10. The method according to claim 1, wherein the method for recovering phosphorus and iron, comprising the following steps of:
A1: taking sewage subjected to grid treatment, adding an iron salt for coagulating sedimentation to prepare Fe-CEPS, and putting the Fe-CEPS into a fermentation bottle for constant-temperature anaerobic fermentation to realize dissolution of iron and phosphorus;
A2: subjecting the fermentation broth in step A1 to high-speed centrifugation and rapid membrane filtration to remove solid impurities;
A3: putting the fermentation supernatant subjected to centrifugation and membrane filtration in step A2 into a beaker container, placing the beaker container on a constant-temperature magnetic stirrer for constant-temperature and constant-speed stirring, and adding an acid solution to adjust a pH value to be 1 to 4 at the same time;
A4: adding hydrogen peroxide into the fermentation broth in step A3 for oxidation, continuously stirring the mixture until a white precipitate appears, and continuously stirring the mixture; and
A5: stopping stirring and continuously carrying out thermal insulation aging, and then carrying out solid-liquid separation, washing and drying, grinding and calcination to obtain a finished iron phosphate crystal product.

11. The method according to claim 10, wherein the acid solution comprises at least one of sulfuric acid and or hydrochloric acid.

12. The method according to claim 1, wherein, in the fermentation supernatant, a molar ratio of iron to phosphorus is 1:0.3 to 3.15.

13. The method according to claim 1, wherein a temperature of the acidic system is 20° C. to 90° C.

* * * * *